(12) United States Patent
Carbune et al.

(10) Patent No.: US 11,946,762 B2
(45) Date of Patent: Apr. 2, 2024

(54) INTERACTIVE VOICE NAVIGATION

(71) Applicant: Google LLC, Mountain View, CA (US)

(72) Inventors: Victor Carbune, Zurich (CH);
Matthew Sharifi, Kilchberg (CH);
Blaise Aguera-Arcas, Seattle, WA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 17/251,244

(22) PCT Filed: Aug. 12, 2020

(86) PCT No.: PCT/US2020/045909
§ 371 (c)(1),
(2) Date: Dec. 11, 2020

(87) PCT Pub. No.: WO2022/035428
PCT Pub. Date: Feb. 17, 2022

(65) Prior Publication Data
US 2023/0160710 A1 May 25, 2023

(51) Int. Cl.
*G01C 21/36* (2006.01)
*G01C 21/34* (2006.01)
(Continued)

(52) U.S. Cl.
CPC ..... *G01C 21/3608* (2013.01); *G01C 21/3415* (2013.01); *G06F 3/165* (2013.01);
(Continued)

(58) Field of Classification Search
CPC ..... G10L 15/22; G06F 3/165; G01C 21/3608; G01C 21/3415
(Continued)

(56) References Cited

U.S. PATENT DOCUMENTS

2009/0150156 A1 6/2009 Kennewick et al.
2016/0061619 A1* 3/2016 Kishore ............... G06F 3/011
701/400
(Continued)

FOREIGN PATENT DOCUMENTS

WO WO 2015/157458 10/2015
WO WO 2020/091806 5/2020

OTHER PUBLICATIONS

International Preliminary Report on Patentability for Application No. PCT/US2020/045909, dated Feb. 23, 2023, 8 pages.
(Continued)

*Primary Examiner* — Peter D Nolan
*Assistant Examiner* — Luke Huynh
(74) *Attorney, Agent, or Firm* — DORITY & MANNING, P.A.

(57) ABSTRACT

The present disclosure is directed to interactive voice navigation. In particular, a computing system can provide audio information including one or more navigation instructions to a user via a computing system associated with the user. The computing system can activate an audio sensor associated with the computing system. The computing system can collect, using the audio sensor, audio data associated with the user. The computing system can determine, based on the audio data, whether the audio data is associated with one or more navigation instructions. The computing system can, in accordance with a determination that the audio data is associated with one or more navigation instructions, determine a context-appropriate audio response. The computing system can provide the context-appropriate audio response to the user.

18 Claims, 5 Drawing Sheets

(51) Int. Cl.
  *G06F 3/16* (2006.01)
  *G10L 15/22* (2006.01)
  *G10L 15/30* (2013.01)

(52) U.S. Cl.
  CPC ........ *G10L 15/22* (2013.01); *G10L 2015/223* (2013.01); *G10L 2015/225* (2013.01); *G10L 2015/228* (2013.01); *G10L 15/30* (2013.01)

(58) Field of Classification Search
  USPC .......................................................... 701/419
  See application file for complete search history.

(56) References Cited

U.S. PATENT DOCUMENTS

2016/0070533 A1\* 3/2016 Foster ..................... G10L 15/22
 704/275
2018/0031385 A1\* 2/2018 Bostick ............ G08G 1/096827

OTHER PUBLICATIONS

International Search Report and Written Opinion for Application No. PCT/US2020/045909, dated May 10, 2021, 13 pages.

\* cited by examiner

INTERACTIVE VOICE NAVIGATION

PRIORITY CLAIM

This application is based upon and claims the right of priority under 35 U.S.C. § 371 to International Application No. PCT/US2020/045909 filed on Aug. 12, 2020, which is incorporated by reference herein.

FIELD

The present disclosure relates generally to navigation. More particularly, the present disclosure relates to improving navigation through voice interaction.

BACKGROUND

As computing technology has improved, the number of computing services offered to users has also increased. Portable computing devices, such as smartphones, allow users to assess navigation services while travelling. Specifically, users can request turn-by-turn directions from one location to another location. To facilitate the navigation services, the user can allow audio navigation information to be provided through a location information from their personal computing device to a remote server associated with the navigation service.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include providing, by a computing system including one or more processors, audio information including one or more navigation instructions to a user. The method can include activating, by the computing system, an audio sensor associated with the computing system. The method can include collecting, by the computing system using the audio sensor, audio data associated with the user. The method can include determining, by the computing system based on the audio data, whether the audio data is associated with the one or more navigation instructions. The method can include, in accordance with a determination that the audio data is associated with the one or more navigation instructions, determining, by the computing system, a context-appropriate audio response. The method can include providing, by the computing system, the context-appropriate audio response to the user.

Other aspects of the present disclosure are directed to various systems, apparatuses, computer-readable media (optionally non-transitory), user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
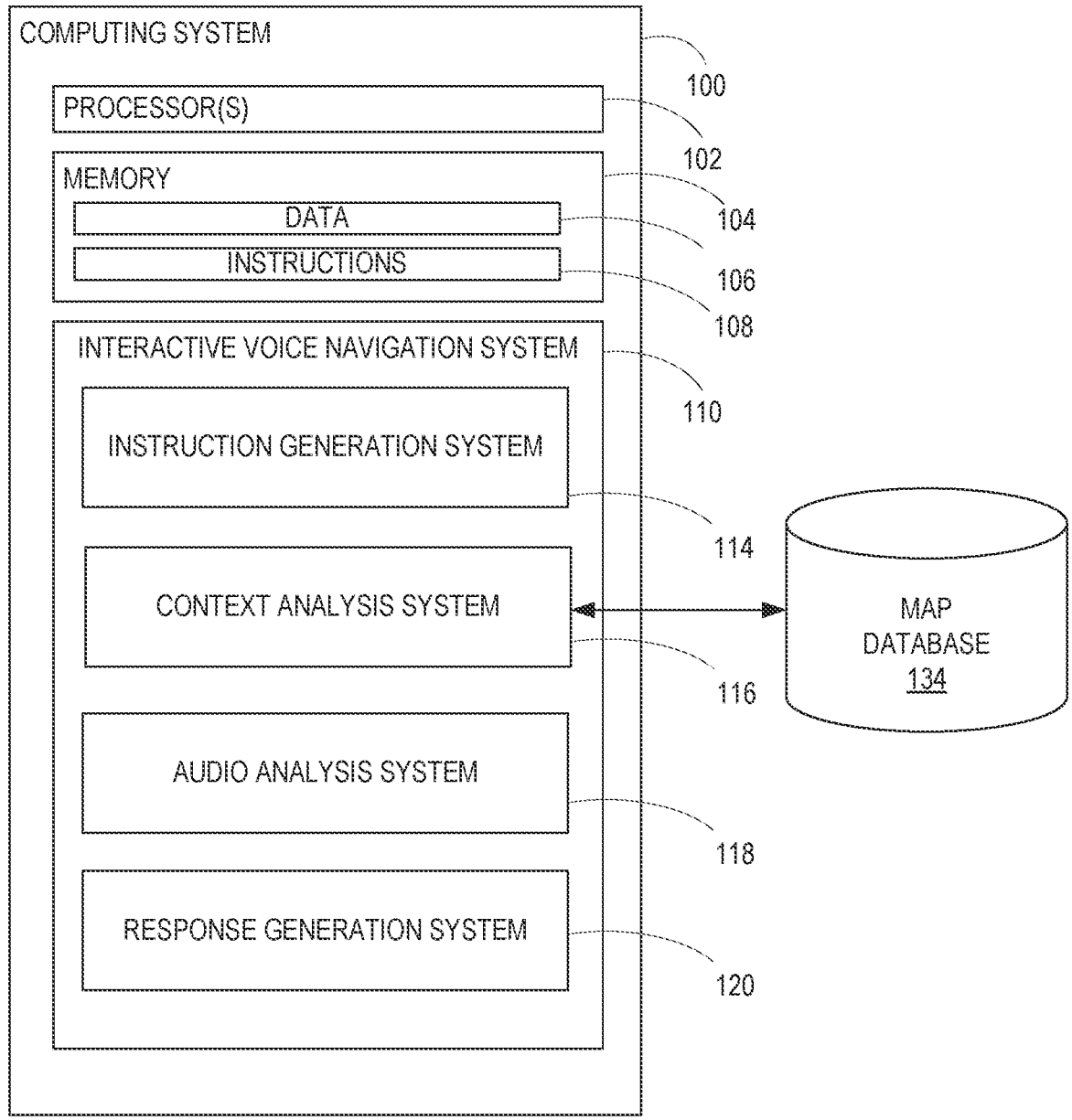
FIG. 1 depicts an example computing environment for an interactive voice navigation system according to example embodiments of the present disclosure.

Generally, the present disclosure is directed towards improving turn-by-turn navigation systems by allowing interactive voice communication between a user and the navigation system while the turn-by-turn instructions are being provided to the user. A navigation system can provide audio information that includes a navigation instruction to a user via a speaker or other device for providing audio information. In other words, the navigation system can communicate audio information that includes a navigation instruction to a user via a speaker or other device for communicating audio information. While the audio information is being provided, the navigation system can cause an audio sensor to be activated. This audio sensor can capture audio data from the user and the user's environment. This audio data can be analyzed by the navigation system or an associated system to determine whether the user is responding to the audio information.

For example, the navigation system can use natural language processing techniques to identify the content of the captured audio data and determine whether it is associated with the audio information. In some examples, a user can respond to the audio information with a request to repeat the audio information or to clarify an aspect of the navigation instruction contained therein. The user can respond to a problem with the audio information itself (e.g., the user couldn't understand the spoken information) or with the navigation instruction contained therein (e.g., the user is unsure how to properly execute the navigation instruction) The navigation system can then determine a context-appropriate response to the user. In this manner, an interactive navigation system is provided that is enabled to help users to more effectively and more safely carry out the technical task of navigation. This is because the response, as described herein, may provide the user with necessary information for navigation and thus the interaction with the user enables the relevant and correct information to be provided to the user, and because the user is able to interact with the navigation via audio communication. As described below, the response may be a repetition (for example if the user hasn't heard the information properly) or may be additional information associated with the navigation instruction (to help the user better understand the instruction). In all of the disclosed examples, the provision of the context-appropriate response provides a technical effect of enabling a user to navigate more effectively and more safely. If the user requests a repetition of the audio information, the navigation system can replay the audio information and may do so at a higher volume level. If the user requests additional information about the navigation instruction, the navigation system can determine appropriate additional information based on stored map and navigation data and provide it to the user via supplemental audio information. Therefore, the provision of the context-appropriate response is able to directly assist the user in performing the technical task of navigation and allows the user to navigate more effectively.

In one example of such a system being used, the navigation system provides, via a speaker in a vehicle, audio information to a user that instructs the user to "turn left in 0.5 miles." While the audio information is played, the navigation system can activate an audio sensor (or change an audio sensor from a passive listening mode to an active listening mode) and record audio data from the user and the user's environment for a predetermined amount of time. The record audio data can be used as described herein in order to determine the context-appropriate response, for example based on the user's spoken words or based on a volume level of the recorded audio data.

The user can respond to the navigation instruction by asking a clarifying question such as "Is that the first or second intersection?" The navigation system can determine that the recorded audio data includes a request for clarification about the navigation instruction. The navigation system can further determine, based on the map data, that the turn referred to by the navigation instruction is at the second intersection. This information can be included in a supplemental audio information that is provided (e.g., played over a speaker) to the user and may include supplemental navigation instructions. The supplemental instructions may include clarifying information associated with the navigation instruction (e.g., clarifying which turn to take). The clarifying information may be additional information associated with the navigation instruction. Thus, the clarifying information for the above example may include an indication that the turn should be made at the second intersection.

The present disclosure therefore allows a system to provide an effective means for providing voice navigation to a user. Specifically, the described system allows a navigation system to efficiently determine when a user requires additional assistance from the navigation system in order to allow the user to carry out a navigation effectively. Furthermore, by allowing voice interaction with the navigation system, the interactive voice navigation system enables the system to react to a user without the need for the user to access an input device, which allows the user to efficiently interact with the navigation system. This also enables the user to safely and in a hands-free manner interact with the navigation system. The user is not visually distracted by the disclosed navigation system and so the user can continue to operate a vehicle (e.g. drive a car) because the voice interaction removes the need for a user to manually input information into a navigation device or even to look down at the navigation device. The present disclosure therefore has a further technical advantage of improving safety when assisting a user in navigation.

In more specific detail, the interactive voice navigation system can be implemented on a computing system. The computing system can be a user's computing system such as a personal computer, a smartphone, a global positioning device, a computing device integrated into a vehicle, a wearable computing system, etc. In another example, the interactive voice navigation system can be implemented at a server remote from the user's computing system and the user's computing system can communicate with the remote server to access the interactive voice navigation service implemented by the server system. In this case, the user's computing system may have a dedicated navigation application or may use a general application as a web browser to access the remote server.

The computing system that implements the interactive voice navigation system can include one or more processors and memory. The one or more processors can be used to implement instructions that describe how the interactive voice navigation system should function. The memory can store these instructions and can also store data necessary to perform the functions of an interactive voice navigation system. In some examples, the memory can store map data that describes the geographic area through which the user is navigating.

The computing system can include an interactive voice navigation system. The interactive voice navigation system can include one or more subsystems or modules. For example, the interactive voice navigation system can include an instruction generation system, a context analysis system, an audio analysis system, and a response generation system.

The instruction generation system can access a list of navigation instructions that make up a turn-by-turn navigation process from a first location to a second location. The list of instructions can represent or include a sequential list of turns and other maneuvers that a vehicle or person must perform to move from the first location to the second location. The instruction generation system can select a current navigation instruction from the list of instructions. For example, the interactive voice navigation system can select each instruction in the list of navigation instructions in sequence as the user moves in accordance with the list of navigation instructions. The interactive voice system can determine the next navigation instruction in the list of navigation instructions based on the previously provided navigation instructions, the position of the user, and an assessment of which instructions have already been completed by the user.

The interactive voice navigation system can generate an audio clip that simulates a human voice speaking the instructions associated with the selected instruction. The generated audio clip can be provided to the user via a speaker associated with the user's computing system (e.g., a smartphone or other computing device) or a speaker included in the user's vehicle (e.g., the vehicle the user is driving).

Once the navigation instruction has been provided to the user as audio, a contextual analysis system can collect and analyze contextual information associated with the provided navigation instruction. Contextual information can include information about the audio environment in which the navigation instructions are presented, and/or information about the complexity of the navigation instructions and/or the complexity of the current navigation environment, and/or information about user activities while the navigation instruction is being presented.

An audio analysis system can access audio data captured as a result of the context analysis system activating a microphone. The audio analysis system can, using speech recognition techniques and natural language processing techniques convert the audio data into a text representation and, if the audio data includes any spoken words, determine whether those spoken words are associated with the navigation instruction. For example, audio data that includes keywords associated with the navigation instruction or that directly ask a question that is relevant to navigation can be determined to be associated with the navigation instruction. Additionally or alternatively, the context analysis system may determine a background noise level in the captured audio data. This is particularly advantageous because a high background noise-level may indicate that the user did not hear the audio navigation instruction (and is thus unaware of the navigation instruction).

The response generation system can determine a context-appropriate response based on the output of the context analysis system and the audio analysis system. For example, if the context analysis system determines that the background noise level in the vehicle is above a predetermined noise threshold, the response generating system can automatically repeat the audio information with a higher volume level. If the audio analysis system determines that the user has asked a clarifying question associated with the navigation instruction, the response generation system can determine one or more answers to the clarifying question and generate an audio clip that includes the relevant information for the user. This audio clip can then be provided to the user via a speaker accessible to the computing device. These embodiments are advantageous because the navigation system uses feedback (either spoken words from the user or a background noise level) to provide further navigation instructions to the user. The further navigation instructions are based on the captured audio data, thereby providing a more effective navigation system for providing a user with navigation instructions.

In some examples, the interactive voice navigation system can be implemented at a server system. In this case, a user computing system (e.g., a smartphone, etc.) can have a user application (e.g., a dedicated application or a general application such as a web browser) that allows the user computing system to communicate with the server system. The server system can include the interactive voice navigation system.

The interactive voice navigation system can receive, from the user computing system, a request for turn-by-turn navigation from a first location to a second location. The interactive voice navigation system can generate a list of navigation instructions that represent a turn-by-turn navigation from the first location to the second location. The list of navigation instructions can be transmitted to the user computing system to be provided to the user.

The user computing system can capture audio data from the environment around the user computing system (e.g., environmental background noise, audio spoken by the user, and so on). The analysis of the audio data can be performed partially on the user computing device and partially on the server system. In other examples, the analysis can be performed entirely on the server system. Thus, the audio data (or a processed version of the audio data) can be transmitted to the server system. The response generation system at the server system can finish the analysis of the audio data and select a context-appropriate response.

As noted above, if the context analysis system determines that the background noise level in the vehicle is beyond a predetermined volume threshold, the response generating system can automatically repeat the audio information with a higher volume level, to improve the chance that the user will hear the audio information containing the navigation instruction. If the audio analysis system determines that the user has asked a clarifying question associated with the navigation instruction, the response generation system can determine one or more answers to the clarifying question and generate audio information that includes the relevant information for the user, thereby ensuring that the user understands the navigation instruction. This audio information can be transmitted to the user computing system for provision to the user via a speaker accessible to the interactive voice navigation system.

The context analysis system can determine information as to the context associated with a particular navigation instruction. To determine this context, the context analysis system can include one or more of: a noise evaluation system, a complexity evaluation system, a conversation evaluation system, a navigation difficulty evaluation system, and a difficulty mitigation system.

The noise evaluation system can passively or actively monitor the background noise associated with the current location of the user. In some examples, the current location of the user is the interior of the vehicle in which the user is riding or driving. In some examples, the user is not in a vehicle (e.g., they are walking) and the current location of the user includes the outdoor geographic space that they are passing through.

The noise evaluation system can determine a volume level for the current environment and may determine whether there are any additional factors that may result in further consideration. For example, loud music playing in the background can be measured to determine a volume level associated with the environment the user is currently in. In addition or alternatively, specific sounds, such as the sound of a baby crying, may be flagged as particularly distracting to a user. In general, a volume level may be determined and any specific sounds that may be particularly loud and potentially distracting to the user may be identified. Based on the background volume level, and optionally any other considerations, the noise evaluation system can determine the level to which the current noise volume may affect the user's ability to hear the audio information and interpret it correctly. For example, as the background noise volume increases, the noise evaluation system can reduce a metric indicating the likelihood that the user has heard and correctly interpreted the audio information that includes the navigation instruction. Determining a volume level for the current environment of the user is particularly advantageous as this indicates the likelihood that the user has heard and correctly interpreted a navigation instruction provided as audio information. This enables further action to be taken (e.g. repeating the audio information) to ensure the user does hear the audio instruction, such that the user is able to carry out the navigation correctly.

A complexity evaluation system can generate a value that represents the degree to which the current navigation instruction is difficult to understand and the current environment is one through which it is difficult to navigate. The complexity evaluation system can access a map database for use in evaluating the complexity of particular environments and particular navigation instructions. For example, if the map data for the area around the user includes multiple different navigation options that are tightly spaced (e.g., a plurality of possible turns), the complexity evaluation system may generate an associated complexity value for the current navigation instruction that is higher than an environment in which only one turn is possible. Similarly, some instructions may be associated with higher complexity than others. For example, if a given highway exit has four possible options (e.g., exit 1A, 1B, 1C, and 1D), navigation instructions that direct the user to take one of the four potential options may be determined to be more complex than an navigation instruction that direct the user to a highway exit with only a single exit option.

The complexity evaluation system can access sensor data associated with the area around the user (or the user's vehicle). In this example, the area around the user or the user's vehicle can be defined as the area within sensor range of the computing system associated with the user (e.g., a smart phone) or the computing system associated with the user's vehicle. The accessed sensor data can be used to determine current navigation complexity based on the number of other objects (e.g., vehicles, bicycles, pedestrians, or any other potential obstacle) sensed nearby (e.g., on a busy street during mid-day due to heavy traffic or bad roads limiting vehicle speed, etc.). The complexity evaluation system can access information about how the vehicle is being operated (e.g., excessive braking, left/right turns to avoid holes in the road or slowing down due to a slippery road) to further determine the complexity of the current situation associated with the user.

In addition, the complexity evaluation system can access data representing the past performance of users in particular situations. Thus, if users frequently misunderstand a particular navigation instruction or have difficulty navigating a particular environment, the complexity evaluation system may assign a higher complexity value to that navigation instruction relative to another instruction that users do not frequently misunderstand.

The conversation evaluation system can determine, prior to providing one or more instructions, whether a conversation is ongoing between the user and another person (e.g., either in their environment or via communication technology). In some examples, the presence of an ongoing conversation between the user and another person may result in the conversation evaluation system determining that the user is more likely to be distracted and therefore less likely to correctly interpret and respond to the audio information.

The navigation difficulty evaluation system can access information from any one or more of the noise evaluation system, the complexity evaluation system, and the conversation evaluation system, to generate a difficulty value for the current navigation instruction that represents the degree to which the user may have difficulty understanding and responding to the audio information.

The difficulty mitigation system determines whether the navigation difficulty value generated by the navigation difficulty evaluation system exceeds a predetermined threshold. If so, the difficulty mitigation system can determine an appropriate mitigation response. For example, the difficulty mitigation system can direct the computing system to repeat the audio information at a higher volume level. In another example, the difficulty mitigation system can delay provision of the audio information while noise levels remain high or while a conversation is currently ongoing. The interactive voice navigation system can determine, based on one or more factors including, but not limited to, the urgency of the audio information and the expected duration of the current noise level or conversation, how long such a delay may last.

Additionally, or alternatively, the difficulty mitigation system can generate an audio query directed towards the user to determine whether the user needs additional information. For example, the difficulty mitigation system can generate an audio output such as "did you understand that instruction" or "do you need more information about that instruction." Based on the user's response, the difficulty mitigation system can generate additional feedback.

As described above, various different factors may be used to determine the difficulty of a navigation instruction and/or the likelihood that a user has heard and interpreted the instruction. Potential issues with a user hearing or understanding a navigation instruction can therefore be mitigated by the difficulty mitigation system, as instructions may automatically be repeated (without prompt from the user), or a user may be asked whether they heard/understood an instruction, or a specific unprompted input from the user ('can you repeat that') can be received and processed. These various techniques are used to ensure that a user is able to hear and understand navigation instructions that are difficult, or in a noisy environment, and so on. Therefore, an effective navigation system is provided that ensures a user is able to receive and understand navigation instructions, in order to effectively carry out the navigation.

The audio analysis system can, based at least in part on the output of the context analysis system, determine an appropriate response to any user interaction with the navigation system. To do so, the audio analysis system includes one or more of: a microphone activation system, a content evaluation system, an association determination system, a response evaluation system, a response selection system, and a transmission system.

The microphone activation system can activate a microphone associated with a user computing system in response to determining audio information is being, will be, or has been provided to the user. In some examples, the microphone is activated based on a predetermined heuristic (e.g., the microphone is activated a predetermined period before audio information is presented or it is activated when the audio information begins being presented.) In other examples, the interactive voice navigation system can use a more complicated model, such as a neural network, that has been trained to, based on a variety of potential inputs, activate the microphone to achieve the greatest likelihood of capturing audio responses from the user and correctly evaluating the current environment of the user.

Furthermore, a navigation system can present information in formats other than an audio format. For example, a navigation system can include, as part of the information delivered to a user, a visual depiction of its navigation instructions and a map displaying how these instructions should be followed through a particular environment. A user may choose to provide audio feedback in response to something in the visual depiction. For example, if a displayed map is updated to provide more detail by zooming in on a particular geographic area, a user can instruct the interactive voice navigation system to "return to previous zoom level." Thus, the microphone can be activated in response to updated visual information in addition to presented audio information.

It should be noted that the audio analysis system may constantly be passively monitoring audio data in the environment of the user computing system and the microphone activation system only switches the system into a more active listening mode. In other examples, the microphone activation system can activate the microphone prior to the audio information being provided to get contextual information (e.g., background noise, ongoing conversation data, etc.) for use in evaluating any user interaction with the navigation system. In other examples, the microphone may be activated only for the duration of the time that the audio information is provided to the user.

The content identification system can access audio data captured by the microphone associated with the user computing system. The content identification system can use one or more natural language processing techniques to identify any voices in the audio data and any words that may have been spoken. Any identified words and/or phrases can be output to the association determination system.

The associated determination system can determine whether the identified words or phrases are associated with the audio information or the navigation instruction contained therein. To do so, the association determination system can identify whether the identified words are associated with navigation generally (e.g., questions about streets, turns, landmarks, and so on) and if so, whether the words are associated with the specific audio information that was recently provided. The associated determination system can employ a trained machine-learned model to distinguish between questions and statements by the user that are appropriate for the interactive navigation system to respond to and those that are not appropriate for the interactive navigation system to respond to.

In response to determining that the question and/or statement from the user is associated with the audio information, the response evaluation system can generate one or more or proposed responses. In some examples, the proposed responses can include repeating the original phrase at a higher volume, providing additional clarification as to where and when the navigation instruction should be followed, giving information about the geographic area and notable landmarks, and updating data stored in the map database based on the user feedback. Updating data stored in the map database based on the user feedback is particularly advantageous because future navigation instructions can be improved based on the updated data. For example, user feedback that indicates a navigation instruction is not clear can be used to update data such that a future navigation instruction is more likely to be understood by the user. This therefore enables a more effective navigation system to be provided that simplifies a user's understanding and interaction with the navigation system.

Additionally, the interactive voice navigation system can store the data associated with user feedback for use in future estimation of the difficulty of a particular navigation instruction. Thus, if a user has a question about a particular instruction or needs additional clarification, the incident can be stored for use by the complexity evaluation system. The complexity evaluation system can use such data as a signal that a particular instruction, intersection, or geographic area should be considered more complicated in future estimations. In some examples, certain types of user feedback (e.g., such as the user stating that "this turn was difficult") can be considered more indicative of complexity or difficulty than others (e.g., a user requesting that an instruction be repeated due to loud music).

The proposed responses can be scored based on one or more scoring criteria by the response selection system. The scoring criteria can include user preferences, information about the current noise levels in the environment of the user, collected data on what users find generally useful in response, and any other criteria that can help the response selection system to identify an appropriate response. The transmission system can generate an audio clip including the selected response and cause it to be provided to the user through a speaker. In some examples, the selected response is agnostic of user preferences or data on what users find generally useful in a response. Instead, in these examples the response provided to the user may be based on objective information, such as additional details regarding the navigation instruction that were not previously provided to the user, and/or information associated with a particular geographic area associated with the navigation instruction. The geographic region information may include details of local landmarks or other features in the geographic region that may help the user to understand the navigation instruction. In these examples, the response provided to the user can provide additional information that enables a user to navigate more effectively. Specifically, this is because the response provides additional objective information associated with the navigation instructions that allows the user to better understand the navigation instructions, thereby allowing the user to navigate more effectively.

The following presents an end-to-end example of the technology described herein. An interactive voice navigation system can provide audio information including a navigation instruction from a list of turn-by-turn navigation instructions to a user. While providing the audio information to the user, the interactive voice navigation system can activate an audio sensor associated with the computing system. The audio sensor can be a microphone. In some examples, the microphone is activated in a passive listening mode before the audio information is provided.

The interactive voice navigation system can determine a navigation difficulty value based on one or more navigation difficulty factors associated with the navigation instruction. The interactive voice navigation system can determine whether the navigation difficulty value exceeds a predetermined threshold. In accordance with a determination that the navigation difficulty value exceeds a predetermined threshold value, the interactive voice navigation system can perform a mitigation action. In some examples, the one or more navigation difficulty factors can include a navigation complexity value associated with the navigation instruction.

In some examples, the one or more navigation difficulty factors can include a map complexity value associated with the navigation instruction. In some examples, the one or more navigation difficulty factors can include a volume level of background noise. In some examples, the one or more navigation difficulty factors can include a determination of whether a conversation is currently ongoing in the area of the audio sensor.

In some examples, the interactive voice navigation system can automatically replay the audio information at an increased volume level. Additionally or alternatively, the interactive voice navigation system can automatically provide a query to prompt the user to report a difficulty in understanding the navigation instruction. Additionally or alternatively, the interactive voice navigation system can collect, using the activated audio sensor, audio data associated with the user. The interactive voice navigation system can determine, based on the audio data, whether the audio data is associated with the audio information.

The interactive voice navigation system can determine that the collected audio data includes a request for repetition from the user. In some examples, the context-appropriate response can be determined to be a repetition of the audio information. The interactive voice navigation system can determine that the collected audio data includes a request for additional information associated with the navigation instruction. In some examples, the context-appropriate response includes clarifying information associated with the navigation instruction.

In some examples, the interactive voice navigation system can determine that the collected audio data includes a request to alter the route associated with the audio instructions. For example, a user may state "alter the route to include a stop at the gas station coming up on the right." Based on this request, the interactive voice navigation system can alter the planned route to include a stop. The list of turn-by-turn instructions can be updated to include the new stop and the user can be presented with any necessary changes to the current route.

The interactive voice navigation system can determine that the collected audio data includes feedback associated with the navigation instruction. In some examples, the context-appropriate response can include a confirmation that the feedback has been recorded.

The interactive voice navigation system can, in accordance with a determination that the audio data is associated with the navigation instruction, determine a context-appropriate audio response. The interactive voice navigation system can provide the context-appropriate audio response to the user through the user computing system associated with the user.

The systems and methods described herein produce a number of technical effects and benefits as discussed above. More particularly, the systems and methods of the present disclosure produce improved techniques for providing voice navigation to a user. Specifically, the described system allows a navigation system to efficiently determine when a user requires additional assistance from the navigation system in order to carry out a navigation effectively. By allowing voice interaction with the navigation system, the interactive voice navigation system enables the system to react to a user without the need for the user to access an input device. In addition, the interactive voice navigation system also enables the user to quickly, efficiently, and in a hands-free manner interact with the navigation system. As a result, the interactive voice navigation system can more efficiently receive input or feedback and appropriately respond. This results in a reduction in the number of processing cycles necessary, reducing the amount of data storage needed, and reducing the amount of energy used by the system. Reducing energy consumption also increases the useful battery life of any battery systems included in the vehicle or user computing device.

With reference to the figures, example embodiments of the present disclosure will be discussed in further detail.

FIG. 1 depicts a computing system for interactive voice navigation according to example aspects of the present disclosure. As illustrated, FIG. 1 includes a computing system 100 that can be used to perform interactive voice navigation. The computing system 100 can include one or more processor(s) 102, memory 104, and an interactive voice navigation system 110.

The one or more processor(s) 102 can be any suitable processing device, such as a microprocessor, microcontroller, integrated circuit, or other suitable processing device. The memory 104 can include any suitable computing system or media, including, but not limited to, computer-readable media (which are optionally non-transitory), RAM, ROM, hard drives, flash drives, or other memory devices. The memory 104 can store information accessible by the one or more processor(s) 102, including instructions 108 that can be executed by the one or more processor(s) 102 and data 108 needed to execute the instructions. The instructions 108 can be any set of instructions that when executed by the one or more processor(s) 102, cause the one or more processor(s) 102 to provide the desired functionality.

In particular, in some devices, memory 104 can store instructions for implementing the interactive voice navigation system 110. The computing system 100 can implement the interactive voice navigation system 110 to execute aspects of the present disclosure, including receiving audio-based interaction from a user while providing navigation services.

It will be appreciated that the term "system" can refer to specialized hardware, computer logic that executes on a more general processor, or some combination thereof. Thus, a system can be implemented in hardware, application specific circuits, firmware and/or software controlling a general-purpose processor. In one embodiment, the system can be implemented as program code files stored on the storage device, loaded into memory, and executed by a processor or can be provided from computer program products, for example computer executable instructions, that are stored in a tangible computer-readable storage medium such as RAM, hard disk or optical or magnetic media.

Memory 104 can also include data 106 that can be retrieved, manipulated, created, or stored by the one or more processor(s) 102. In some example embodiments, such data can be accessed and used as input to the interactive voice navigation system 110. In some examples, the memory 104 can include data used to perform one or more processes and instructions that describe how those processes can be performed.

In some examples the interactive voice navigation system 110 can include an instruction generation system 114, a context analysis system 116, an audio analysis system 118, and a response generation system 120. Each component included in the interactive voice navigation system 110 can be implemented as a distinct system or as one component of an overall system. In some examples, the computing system 100 can be connected to a map database 134 that includes data describing a one or more characteristics of a plurality of geographic areas that can be used to generate navigation instructions.

The instruction generation system 114 can access a list of navigation instructions that make up a turn-by-turn navigation process from a first location to a second location. The list of instructions can represent or include a sequential list of turns and other maneuvers that a vehicle or person must perform to move from the first location to the second location. The instruction generation system 114 can select a current navigation instruction from the list of instructions. For example, the interactive voice navigation system 110 generally can select each instruction in the list of navigation instructions in sequence as the user moves in accordance with the list of navigation instructions. The interactive voice navigation system 110 can determine the next navigation instruction in the list of navigation instructions based on the previously provided navigation instructions, the position of the user, and an assessment of which instructions have already been completed by the user.

The instruction generation system 114 can generate an audio clip that simulates a human voice speaking the instructions associated with the selected instruction selected by the interactive voice navigation system 110. The generated audio clip can be provided to the user via a speaker associated with the user's computing system (e.g., a smartphone or other computing device) or a speaker included in the user's vehicle (e.g., the vehicle the user is driving).

Once the navigation instruction has been provided to the user as audio, a context analysis system 116 can collect and analyze contextual information associated with the provided navigation instruction. Contextual information can include information about the audio environment in which the navigation instructions are provided, information about the complexity of the navigation instructions and the complexity of the current navigation environment, and information about user activities while the navigation instruction is being provided.

An audio analysis system 118 can access audio data captured as a result of the context analysis system activating a microphone. The audio analysis system 118 can, using natural language processing techniques, determine whether the audio includes any spoken words and if so, whether those spoken words are associated with the navigation instruction. For example, audio data that includes keywords associated with the navigation instruction or that directly ask a question that is relevant to navigation can be determined to be associated with the navigation instruction.

The response generation system 120 can determine a context-appropriate response based on the output of the context analysis system and the audio analysis system. For example, if the context analysis system 116 determines that the background noise level in the vehicle is above a predetermined noise threshold, the response generating system 120 can automatically repeat the audio information with a higher volume level. If the audio analysis system 118 determines that the user has asked a clarifying question associated with the navigation instruction, the response generation system 120 can determine one or more answers to the clarifying question and generate an audio clip that includes the relevant information for the user. This audio clip can then be provided to the user via a speaker accessible to the computing device.

In some example embodiments, the map database 134 can store a variety of map and navigation data. For example, the map database 134 can include map data relevant to navigation. In some examples, the map data can include a series of sub-maps, each sub-map including data for a geographic area including objects (e.g., buildings or other static features), paths of travel (e.g., roads, highways, public transportation lines, walking paths, and so on), and other features of interest. The map database can also include image data, the image data associated with one or more geographic areas. The map database 134 can also include satellite image data associated with one or more geographic areas.

Figure 2:
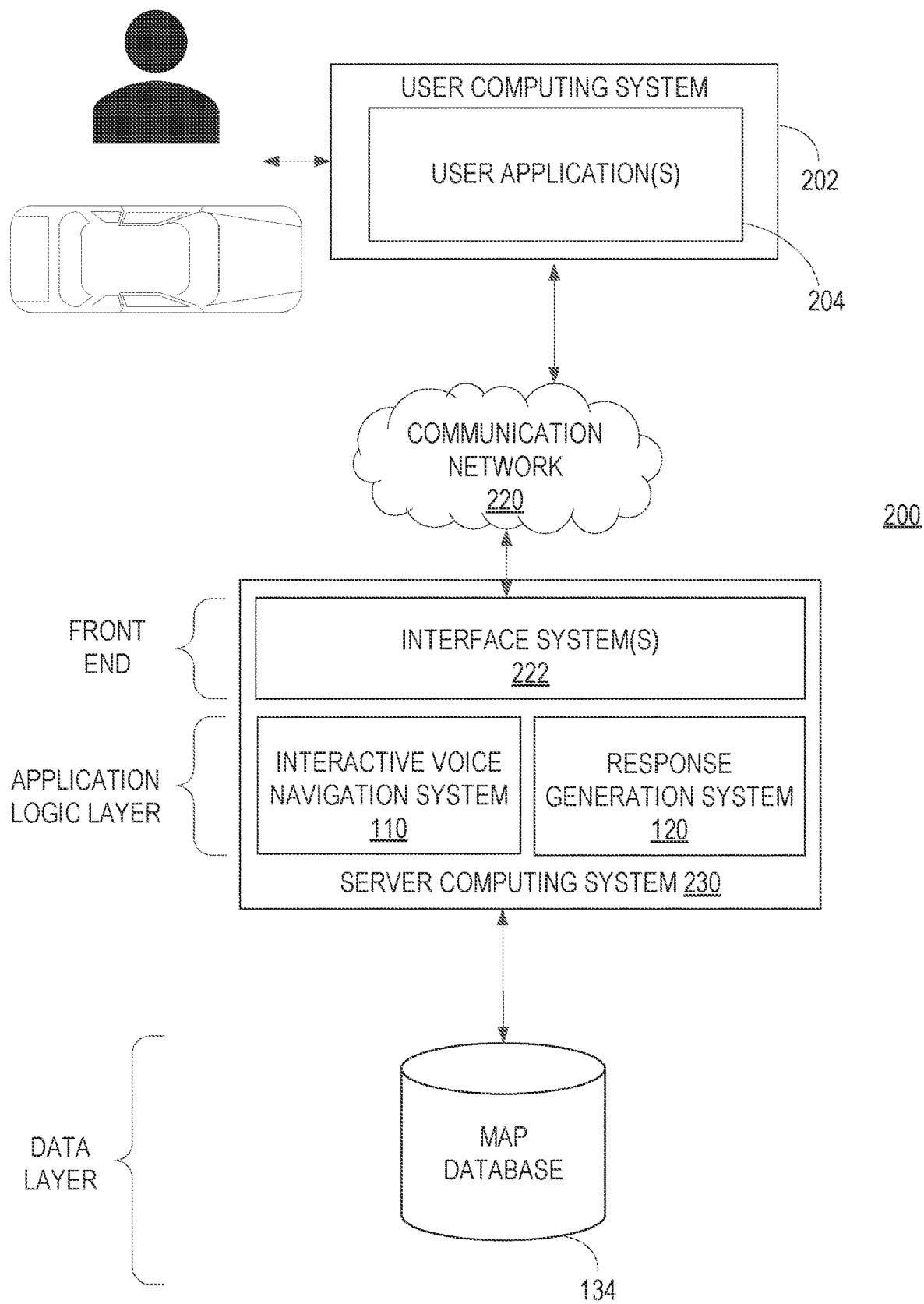
FIG. 2 depicts an example client-server environment according to example embodiments of the present disclosure.

FIG. 2 depicts an example client-server environment according to example embodiments of the present disclosure. The client-server system environment 200 includes one or more user computing systems 202 and the server computing system 230. One or more communication networks 220 can interconnect these components. The communication networks 220 may be any of a variety of network types, including local area networks (LANs), wide area networks (WANs), wireless networks, wired networks, the Internet, personal area networks (PANs), or a combination of such networks.

A user computing system 202 can be an electronic device, such as a personal computer (PC), a laptop, a smartphone, a tablet, a mobile phone, a wearable computing device, an electrical component of a vehicle or any other electronic device capable of communication with the communication network 220. A user computing system 202 can include one or more user application(s) 204 such as search applications, communication applications, navigation applications, productivity applications, game applications, word processing applications, or any other useful applications. The user application(s) 204 can include a web browser. The user computing system 202 can use a web browser (or other application) to send and receive requests to and from the server computing system 230.

In some examples, a user computing system 202 can include one or more sensors that can be used to determine the current location of the user computing system 202. This information can be transmitted, with the user's permission, the location of the user computing system 202 to the server computing system 230 in associated with providing a navigation service. This data can be used by the interactive voice navigation system 110 in coordination with data accessed from the map data 134. In some examples, one or more navigation instructions (e.g., the most recent navigation instruction or an upcoming navigation instruction) can be stored on the user computing system 202 temporarily.

As shown in FIG. 2, the server computing system 230 can generally be based on a three-tiered architecture, consisting of a front-end layer, application logic layer, and data layer. As is understood by skilled artisans in the relevant computer and Internet-related arts, each component shown in FIG. 2 can represent a set of executable software instructions and the corresponding hardware (e.g., memory and processor) for executing the instructions. To avoid unnecessary detail, various components and engines that are not germane to conveying an understanding of the various examples have been omitted from FIG. 2. However, a skilled artisan will readily recognize that various additional components and engines may be used with a server computing system 230, such as that illustrated in FIG. 2, to facilitate additional functionality that is not specifically described herein. Furthermore, the various components depicted in FIG. 2 may reside on a single server computer or may be distributed across several server computers in various arrangements. Moreover, although the server computing system 230 is depicted in FIG. 2 as having a three-tiered architecture, the various example embodiments are by no means limited to this architecture.

As shown in FIG. 2, the front end consists of an interface system(s) 222, which receives communications from user computing systems 202 and communicates appropriate responses to the user computing system 202. For example, the interface system(s) 222 may receive requests in the form of Hypertext Transfer Protocol (HTTP) requests, or other web-based, application programming interface (API) requests. The user computing system 202 may be executing conventional web browser applications or applications that have been developed for a specific platform to include any of a wide variety of mobile devices and operating systems.

As shown in FIG. 2, the data layer can include a map database 134. In some example embodiments, the map database 134 can store a variety of map and navigation data. For example, the map database 134 can include map data relevant to navigation. In some examples, the map data can include a series of sub-maps, each sub-map including data for a geographic area including objects (e.g., buildings or other static features), paths of travel (e.g., roads, highways, public transportation lines, walking paths, and so on), and other features of interest. The map database can also include image data, the image data associated with one or more geographic areas. The map database 134 can also include satellite image data associated with one or more geographic areas.

The application logic layer can include application data that can provide a broad range of other applications and services that allow users to access or receive geographic data for navigation or other purposes. The application logic layer can include an interactive voice navigation system 110 and response generation system 120.

The interactive voice navigation system 110 can receive, from the user computing system 202, a request for turn-by-turn navigation from a first location to a second location. The interactive voice navigation system 110 can generate a list of navigation instructions that represents a turn-by-turn navigation from the first location to the second location. The list of navigation instructions can be transmitted to the user computing system 202 to be provided to the user.

The user computing system 202 can capture audio data from the environment around the user computing system 202 (e.g., environmental background noise, audio spoken by the user, and so on). The analysis of the audio data can be performed partially on the user computing system 202 and partially on the server system. In other examples, the analysis can be performed entirely on the server computing system 230. Thus, the audio data (or a processed version of the audio data) can be transmitted to the server system. The response generation system 120 at the server computing system 230 can finish the analysis of the audio data and select a context-appropriate response.

Figure 3:
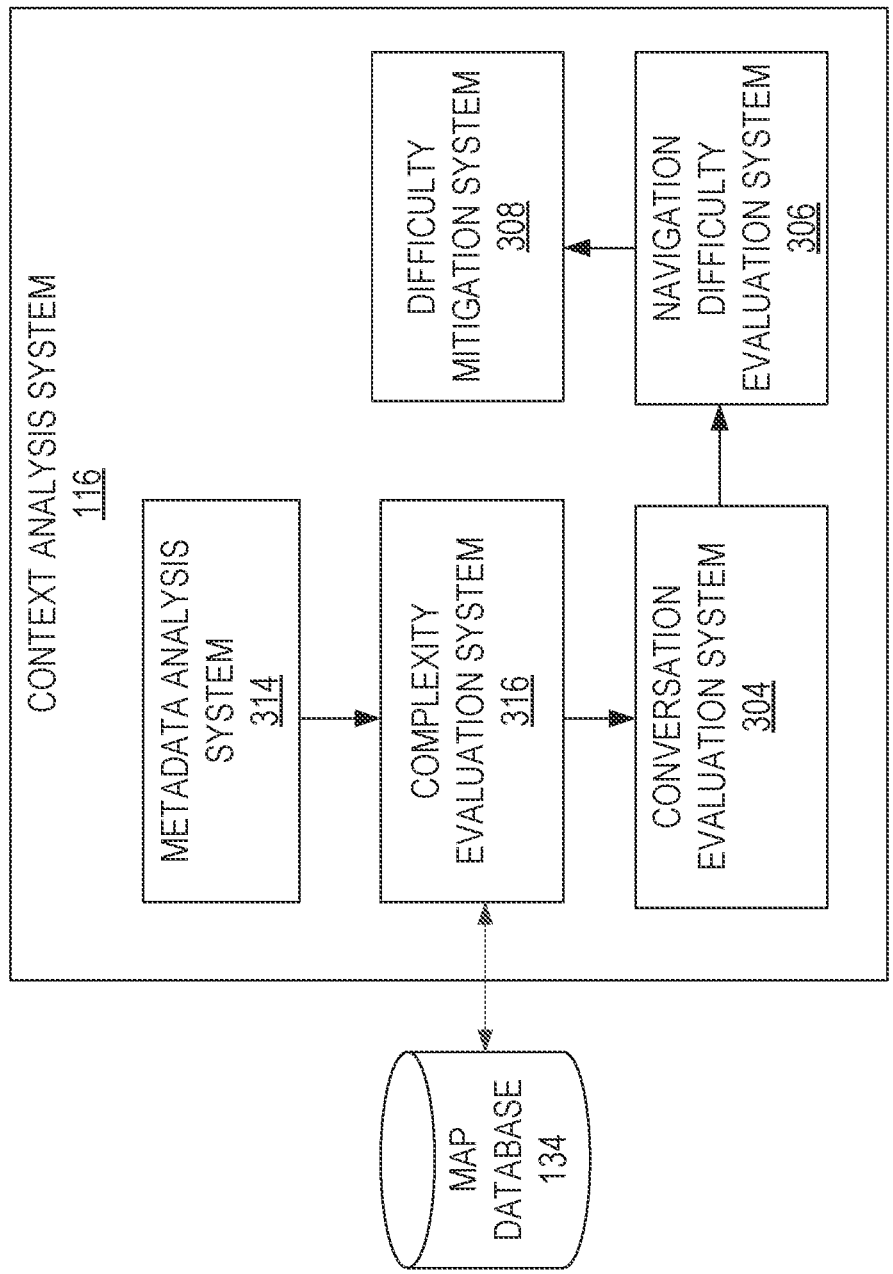
FIG. 3 depicts a block diagram of a context analysis system according to example embodiments of the present disclosure.

FIG. 3 depicts a block diagram of a context analysis system 116 according to example embodiments of the present disclosure. The context analysis system 116 can determine information as to the context associated with a particular navigation instruction. To determine this context, the context analysis system 116 can include one or more of: metadata analysis system 314, a complexity evaluation system 316, a conversation evaluation system 304, a navigation difficulty evaluation system 306, and a difficulty mitigation system 308.

The metadata analysis system 314 can receive, from the audio analysis system (e.g., audio analysis system 116 in FIG. 1), information about the current state of the user, any user response, and information about the current audio instructions. For example, the metadata analysis system can receive information about the current noise level around the user (e.g., in the user's vehicle). The metadata can include a transcript of audio information received from a user for analysis.

The metadata analysis system 314 can determine, based on metadata received from the audio analysis system (e.g., audio analysis system 116 in FIG. 1) a volume level for the current environment. The metadata analysis system 314 can determine whether there are any additional factors that may result in further consideration. For example, loud music playing in the background can be measured to determine a volume level associated with the environment the user is currently in. In addition or alternatively, specific sounds such as the sound of a baby crying may be flagged as particularly distracting to a user. Based on the background volume level, and optionally any other considerations, the metadata analysis system 314 can determine the level to which the current noise volume may affect the user's ability to hear the audio information and interpret it correctly. For example, as the background noise volume increases, the metadata analysis system 314 can reduce a metric indicating the likelihood that the user has heard and correctly interpreted the audio information that includes the navigation instruction.

A complexity evaluation system 316 can generate a value that represents the degree to which the current navigation instruction is difficult to understand and the current environment is one through which it is difficult to navigate. For example, if the map data 134 for the area around the user includes multiple different navigation options that are tightly spaced (e.g., a plurality of possible turns), the complexity evaluation system 316 may generate an associated complexity value for the current navigation instruction that is higher than an environment in which only one turn is possible. Similarly, some instructions may be associated with higher complexity than others. For example, if a given highway exit has four possible options (e.g., exit 1A, 1B, 1C, and 1D), navigation instructions that direct the user to take one of the four potential options may be determined to be more complex than an navigation instruction that direct the user to a highway exit with only a single exit option.

The complexity evaluation system 316 can access a map database 134 for use in evaluating the complexity of particular environments and particular navigation instructions. In addition, the complexity evaluation system 316 can access data representing the past performance of users in particular situations. Thus, if users frequently misunderstand a particular navigation instruction or have difficulty navigating a particular environment, the complexity evaluation system 316 may assign a higher complexity value to that navigation instruction relative to another instruction that users do not frequently misunderstand.

The conversation evaluation system 304 can determine, prior to providing one or more instructions, whether a conversation is ongoing between the user and another person (e.g., either in their environment or via communication technology). In some examples, the presence of an ongoing conversation between the user and another person may result in the conversation evaluation system 304 determining that the user is more likely to be distracted and therefore less likely to correctly interpret and respond to the audio information.

The navigation difficulty evaluation system 306 can access information from the metadata analysis system 314, the complexity evaluation system 316, and the conversation evaluation system 304, to generate a difficulty value for the current navigation instruction that represents the degree to which the user may have difficulty understanding and responding to the audio information.

The difficulty mitigation system 308 determines whether the navigation difficulty value generated by the navigation difficulty evaluation system 306 exceeds a predetermined threshold. If so, the difficulty mitigation system 308 can determine an appropriate mitigation response. For example, the difficulty mitigation system 308 can direct the computing system to repeat the audio information at a higher volume level.

Additionally, or alternatively, the difficulty mitigation system 308 can generate an audio query directed towards the user to determine whether the user needs additional information. For example, the difficulty mitigation system 308 can generate an audio output such as "did you understand that instruction" or "do you need more information about that instruction." Based on the user's response, the difficulty mitigation system 308 can generate additional feedback.

Figure 4:
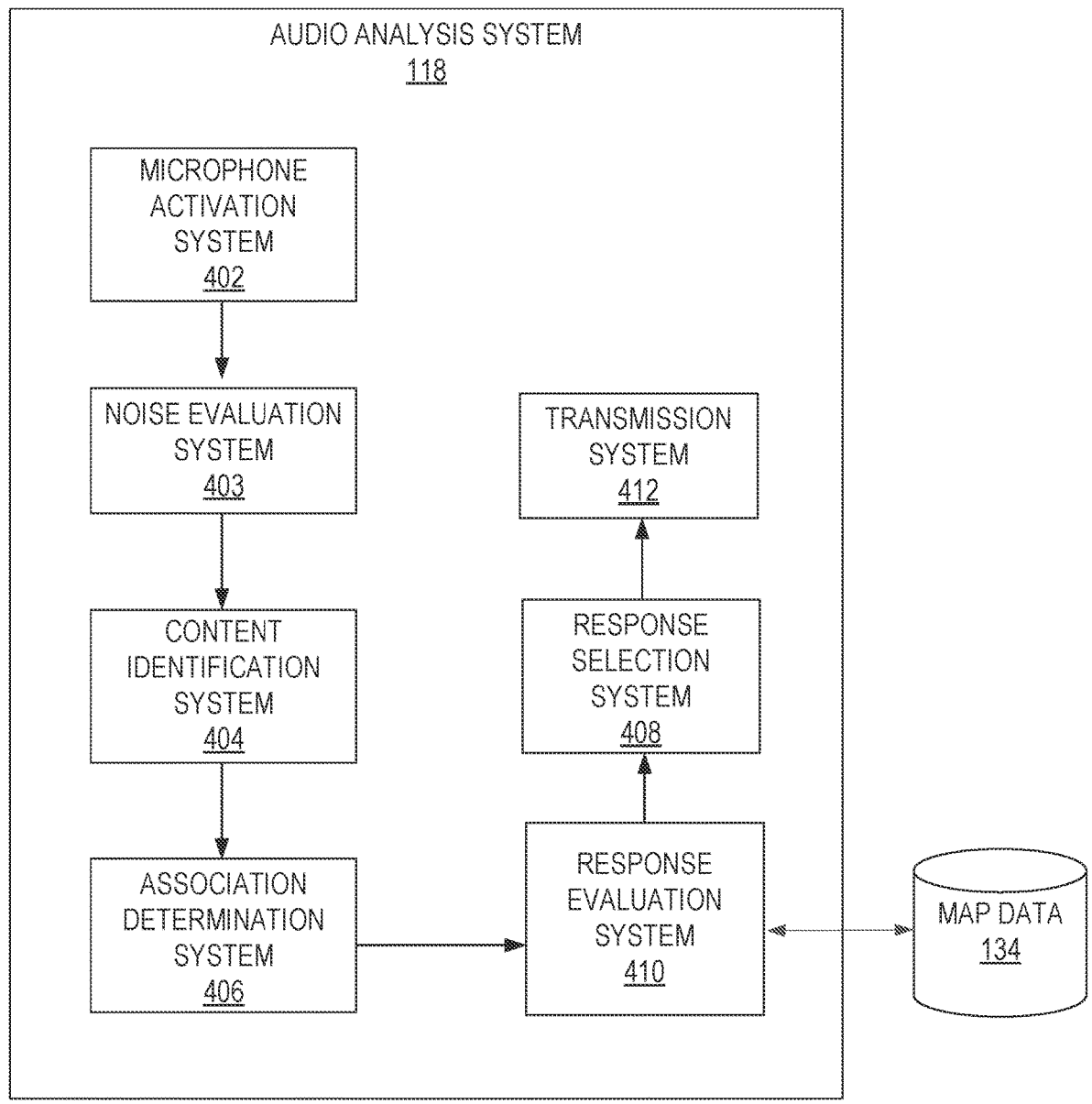
FIG. 4 depicts a block diagram of an example audio analysis system according to example embodiments of the present disclosure.

FIG. 4 depicts a block diagram of an example audio analysis system 118 according to example embodiments of the present disclosure. The audio analysis system 118 can, based at least in part on the output of the context analysis system 116, determine an appropriate response to any user interaction with the navigation system. To do so, the audio analysis system includes one or more of: a microphone activation system 402, a noise evaluation system 403, a content evaluation system 404, an association determination system 406, a response evaluation system 410, a response selection system 408, and a transmission system 412.

The microphone activation system 402 can activate a microphone associated with a user computing system (e.g., user computing system 202 in FIG. 2) in response to determining audio information is being, will be, or has been provided to the user. It should be noted that the audio analysis system 118 may constantly be passively monitoring audio data in the environment of the user computing system (e.g., user computing system 202 in FIG. 2) and the microphone activation system 402 only switches the system into a more active listening mode. In other examples, the microphone activation system 402 can activate the microphone prior to the audio information being provided to get contextual information (e.g., background noise, ongoing conversation classification, etc.) for use in evaluating any user interaction with the navigation system. In other examples, the microphone may be activated only for the duration of the time that the audio information is provided to the user.

In some examples, a passive listening mode can be a mode in which audio information is gathered but is only (or primarily) analyzed to identify signals as to whether the full capabilities of the audio analysis system (e.g., speech recognition and natural language processing) should be activated or engaged. Thus, the number of processing cycles (and therefore the amount of energy consumed) is significantly reduced when in a passive listening mode.

Additionally, in some examples, a passive listening mode may be implemented to occur solely on a user computing system (e.g., user computing system 202 in FIG. 2). An actively listening mode can be implemented such that components at both the user computing system (e.g., user computing system 202 in FIG. 2) or the server computing system (e.g., server computing system 230 in FIG. 2) can be utilized.

The noise evaluation system 403 can passively or actively monitor the background noise associated with the current location of the user. In some examples, the current location of the user is the interior of the vehicle in which the user is riding or driving. In some examples, the user is not in a vehicle (e.g., they are walking) and the current location of the user includes the outdoor geographic space that they are passing through. In general, a volume level may be determined and any specific sounds that may be particularly loud and potentially distracting to the user may be identified. Based on the audio information and background noise, the noise evaluation system 403 can generate noise metadata for use by the content analysis system 116.

The content identification system 404 can access audio data captured by the microphone associated with the user computing system (e.g., user computing system 202 in FIG. 2). The content identification system 404 can use one or more natural language processing techniques to identify any voices in the audio data and any words that may have been spoken. Any identified words and/or phrases can be output to the association determination system.

The associated determination system 406 can determine whether the identified words or phrases are associated with the audio information or the navigation instruction contained therein. To do so, the association determination system 406 can identify whether the identified words are associated with navigation generally (e.g., questions about streets, turns, landmarks, and so on) and if so, whether the words are associated with the specific audio information that was recently provided. The associated determination system 406 can employ a trained machine-learned model to distinguish between questions and statements by the user that are appropriate for the interactive voice navigation system (e.g., interactive voice navigation system 110 in FIG. 1) to respond to and those that are not appropriate for the interactive voice navigation system (e.g., interactive voice navigation system 110 in FIG. 1) to respond to.

In response to determining that the question and/or statement from the user is associated with the audio information, the response evaluation system 410 can generate one or more or proposed responses. In some examples, the proposed responses can include repeating the original phrase at a higher volume, providing additional clarification as to where and when the navigation instruction should be followed, giving information about the geographic area and notable landmarks, and updating data stored in the map database based on the user feedback.

Figure 5:
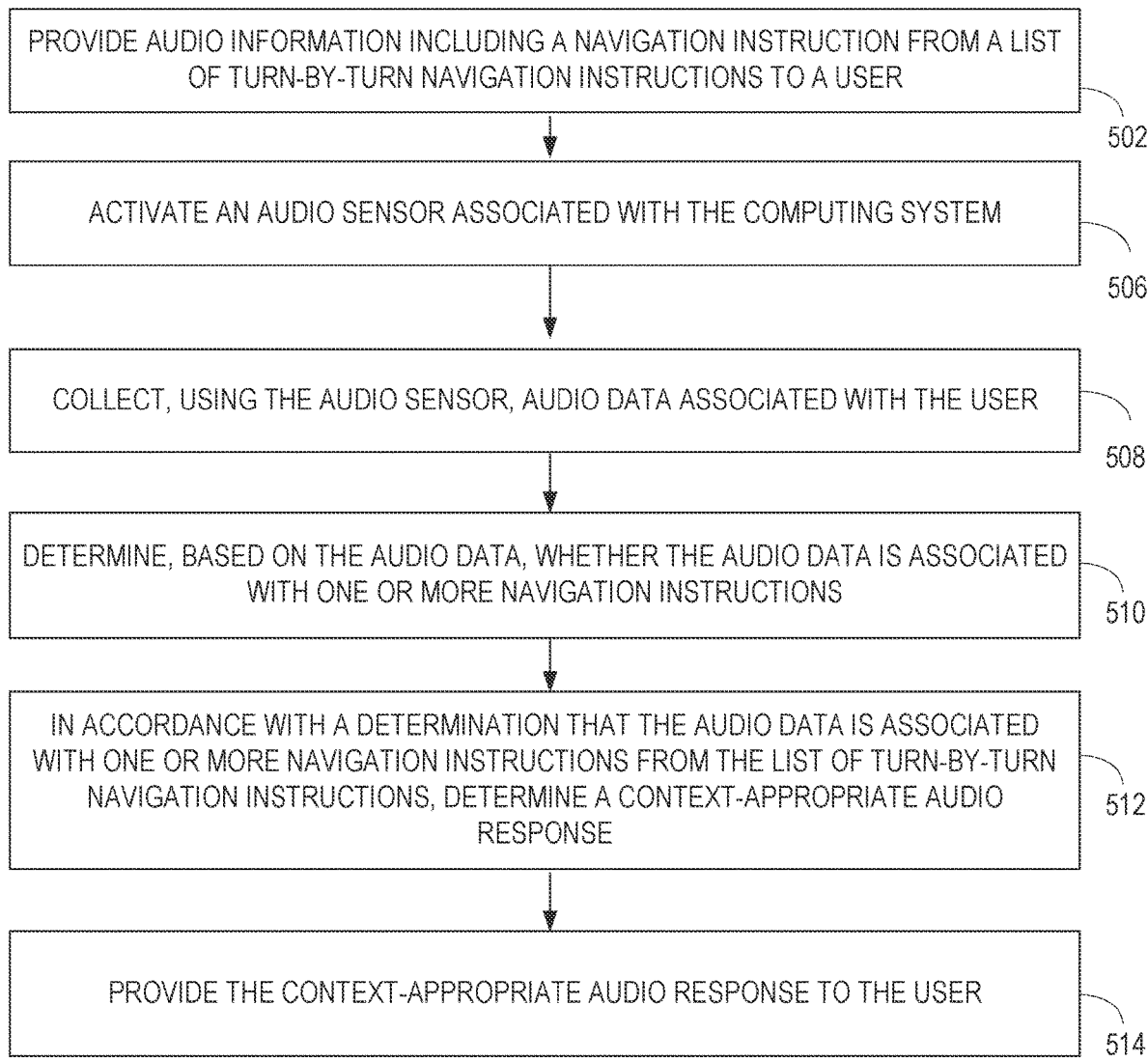
FIG. 5 depicts a flow chart of an example method for interactive voice navigation according to example embodiments of the present disclosure.

The proposed responses can be scored based on one or more scoring criteria by the response selection system 408. The scoring criteria can include user preferences, information about the current noise levels in the environment of the user, collected data on what users find generally useful in response, and any other criteria that can help the response selection system 408 to identify an appropriate response. The transmission system 412 can generate an audio clip including the selected response and cause it to be provided to the user through a speaker. In some examples, the selected response is agnostic of user preferences or data on what users find generally useful in a response FIG. 5 depicts a flow chart of an example method for interactive voice navigation according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 1-2.

An interactive voice navigation system can provide, at 502, audio information including a navigation instruction from a list of turn-by-turn navigation instructions to a user. While providing the audio information to the user, the interactive voice navigation system can activate, at 506, an audio sensor associated with the computing system. The audio sensor can be a microphone. In some examples, the microphone is activated in a passive listening mode before the audio information is provided. In some examples, the microphone is activated for listening for the duration of time in which the audio information is provided.

The interactive voice navigation system can determine a navigation difficulty value based on one or more navigation difficulty factors associated with the navigation instruction. The interactive voice navigation system can determine whether the navigation difficulty value exceeds a predetermined threshold. In accordance with a determination that the navigation difficulty value exceeds a predetermined threshold value, the interactive voice navigation system can perform a mitigation action. In some examples, the one or more navigation difficulty factors can include a navigation complexity value associated with the navigation instruction.

In some examples, the one or more navigation difficulty factors can include a map complexity value associated with the navigation instruction. In some examples, the one or more navigation difficulty factors can include a volume level of background noise. In some examples, the one or more navigation difficulty factors can include a determination of whether a conversation is currently ongoing in the area of the audio sensor.

The interactive voice navigation system can automatically replay the audio information at an increased volume level. The interactive voice navigation system can automatically provide a query to prompt the user to report a difficulty in understanding the navigation instruction. The interactive voice navigation system can, at 508, collect, using the activated audio sensor, audio data associated with the user. The interactive voice navigation system can, at 510, determine, based on the audio data, whether the audio data is associated with the audio information.

The interactive voice navigation system can determine that the collected audio data includes a request for repetition from the user. In some examples, the context-appropriate response can be determined to be a repetition of the audio information. The interactive voice navigation system can determine that the collected audio data includes a request for additional information associated with the navigation instruction. In some examples, the context-appropriate response includes clarifying information associated with the navigation instruction.

The interactive voice navigation system can determine that the collected audio data includes feedback associated with the navigation instruction. In some examples, the context-appropriate response can include a confirmation that the feedback has been recorded.

The interactive voice navigation system can, in accordance with a determination that the audio data is associated with the navigation instruction, determine, at 512, a context-appropriate audio response. The interactive voice navigation system can provide, at 514, the context-appropriate audio response to the user through the user computing system associated with the user.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for interactive voice navigation, the method comprising:
   providing, by a computing system including one or more processors, audio information including one or more navigation instructions to a user;
   determining, by the computing system, a navigation difficulty value associated with the one or more navigation instructions based on one or more navigation difficulty factors;
   determining, by the computing system, whether the navigation difficulty value exceeds a predetermined threshold;
   in accordance with a determination that the navigation difficulty value exceeds a predetermined threshold, performing, by the computing system, a mitigation action;
   activating, by the computing system, an audio sensor associated with the computing system;
   collecting, by the computing system using the audio sensor, audio data associated with the user;
   determining, by the computing system based on the audio data, whether the audio data is associated with the one or more navigation instructions;
   in accordance with a determination that the audio data is associated with the one or more navigation instructions, determining, by the computing system, a context-appropriate audio response; and
   providing, by the computing system, the context-appropriate audio response to the user.

2. The computer-implemented method of claim 1, wherein determining, by the computing system based on the audio data, whether the audio data is associated with one or more navigation instructions further comprises:
   determining, by the computing system, that the collected audio data includes a request from the user for repetition of the one or more navigation instructions.

3. The computer-implemented method of claim 1, wherein the context-appropriate audio response is determined to be a repetition of the audio information including the one or more navigation instructions.

4. The computer-implemented method of claim 1, wherein determining, by the computing system based on the audio data, whether the audio data is associated with one or more navigation instructions further comprises:
   determining, by the computing system, that the collected audio data includes a request for additional information associated with the one or more navigation instructions.

5. The computer-implemented method of claim 4, wherein the context appropriate audio response includes clarifying information associated with the one or more navigation instructions.

6. The computer-implemented method of claim 1, wherein determining, by the computing system based on the audio data, whether the audio data is associated with one or more navigation instructions further comprises:
   determining, by the computing system, that the collected audio data includes a request to alter a route associated with the one or more navigation instructions.

7. The computer-implemented method of claim 1, wherein determining, by the computing system based on the audio data, whether the audio data is associated with the one or more navigation instructions further comprises:
   determining, by the computing system, that the collected audio data includes feedback information associated with the one or more navigation instructions.

8. The computer-implemented method of claim 7, wherein the context appropriate audio response includes a confirmation that the feedback information has been recorded.

9. The computer-implemented method of claim 1, wherein the one or more navigation difficulty factors include a navigation complexity value associated with the one or more navigation instructions.

10. The computer-implemented method of claim 1, wherein the one or more navigation difficulty factors include a map complexity value associated with the one or more navigation instructions.

11. The computer-implemented method of claim 1, wherein the one or more navigation difficulty factors include a volume level of background noise.

12. The computer-implemented method of claim 1, wherein the one or more navigation difficulty factors include a determination whether a conversation is currently ongoing in an area around the audio sensor.

13. The computer-implemented method of claim 1, wherein performing, by the computing system, a mitigation action comprises:
   automatically replaying, by the computing system, the audio information including the one or more navigation instructions at an increased volume level.

14. The computer-implemented method of claim 1, wherein performing, by the computing system, a mitigation action comprises:
   automatically providing, by the computing system, a query to prompt the user to report a difficulty in understanding the one or more navigation instructions.

15. The computer-implemented method of claim 1, wherein the audio data comprises audio data captured from an environment around the user.

16. The computer-implemented method of claim 1, wherein the audio sensor is activated in a passive listening mode before the one or more navigation instructions is provided.

17. A computing system for performing interactive voice navigation, the system comprising:
- one or more processors and one or more computer-readable memories;
- wherein the one or more computer-readable memories store instructions that, when executed by the one or more processors, cause the computing system to perform operations, the operations comprising:
- providing audio information including one or more navigation instructions to a user;
- determining a navigation difficulty value associated with the one or more navigation instructions based on one or more navigation difficulty factors;
- determining whether the navigation difficulty value exceeds a predetermined threshold;
- in accordance with a determination that the navigation difficulty value exceeds a predetermined threshold, performing a mitigation action;
- activating an audio sensor associated with the computing system;
- collecting, using the audio sensor, audio data associated with the user;
- determining, based on the audio data, whether the audio data is associated with the one or more navigation instructions;
- in accordance with a determination that the audio data is associated with the one or more navigation instructions, determining a context-appropriate audio response;
- providing the context-appropriate audio response to the user.

18. A non-transitory computer-readable medium storing instruction that, when executed a computing system, cause the computing system to perform operations, the operations comprising:
- providing audio information including one or more navigation instructions to a user;
- determining a navigation difficulty value associated with the one or more navigation instructions based on one or more navigation difficulty factors;
- determining whether the navigation difficulty value exceeds a predetermined threshold;
- in accordance with a determination that the navigation difficulty value exceeds a predetermined threshold, performing a mitigation action;
- activating an audio sensor associated with the computing system;
- activating an audio sensor associated with the computing system;
- collecting, using the audio sensor, audio data associated with the user;
- determining, based on the audio data, whether the audio data is associated with the one or more navigation instructions;
- in accordance with a determination that the audio data is associated with the one or more navigation instructions, determining a context-appropriate audio response; and
- providing the context-appropriate audio response to the user.

* * * * *